Dec. 8, 1959   G. C. CALDERWOOD   2,916,403
BONDING COMPOSITIONS
Filed Aug. 16, 1956
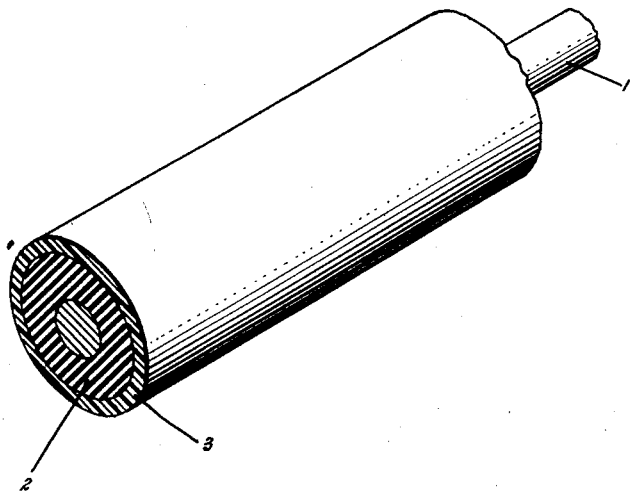
Inventor:
Gene C. Calderwood,
by Robert G. Scully
His Attorney.

United States Patent Office 2,916,403
Patented Dec. 8, 1959

2,916,403

BONDING COMPOSITIONS

Gene C. Calderwood, Pittsfield, Mass., assignor to General Electric Company, a corporation of New York Application August 16, 1956, Serial No. 604,367

4 Claims. (Cl. 117—232)

This invention relates to bonding compositions. More particularly, it relates to polyurethane type bonding compositions which are non-tacky and thermoplastic in nature as prepared and which upon heating to a suitable temperature, fuse and become thermoset or substantially infusible and insoluble. These compositions are characterized by long shelf life in their thermoplastic state and are particularly useful where it is desired to apply a coating or film of material to a base such as an insulated wire or other structure which coating may be converted to a thermoset state at any later time simply by heating the material to a suitable temperature.

There has been a long felt need for a bonding or adhesive material of the polyurethane type which may be applied to the parts to be bonded as a tough, non-tacky, thermoplastic film or coating which will remain non-tacky and thermoplastic over a long period of time at room temperature or even higher until, when subjected to suitable high temperatures, the coating fuses to a thermoset state bonding together any structure such as an electrical coil or winding or stacked laminations and the like of which it is a part without other support.

It has been known in the polyurethane resin art that thermoset enamels or coatings may be made from polyesters containing three or more hydroxyl groups and a polyisocyanate. Because of the extremely high reactivity of the polyisocyanate, even at normal temperatures, with free hydrogen, and to reduce the toxicity of the isocyanate, it has been customary to block or temporarily inactivate the isocyanate groups by reacting them as with a material containing reactive hydrogen which will tie up or mask the isocyanate groups at ordinary temperatures, but which will split off at elevated temperatures, regenerating the isocyanate groups so that they may react with the hydroxyl or other reactive group of polyester material producing a three dimensional polymer or enamel. Compounds of the phenol type are commonly used as so-called isocyanate splitters to temporarily mask the isocyanate; however, other materials which may be used for this purpose are well known in the art, malonic ester being an example. In order to apply polyurethane resins such as those above as flexible, tack-free coatings, they must be heated to a temperature at which the isocyanate groups will be liberated; whereupon they immediately react and change to the thermoset stage so that particular configurations such as coils or windings in which it is desired that the bonding coatings on individual wires or turns be fused together to form a self-supporting structure must be made before the wire or other structure is coated. The difficulty of such a procedure is apparent.

There is a definite requirement for a bonding material which may be applied as a tough, flexible, non-tacky, thermoplastic coating or film on a base such as insulated wire, which will remain thermoplastic for prolonged periods of time at room temperature or above, and which, upon heating to higher temperatures, will fuse to a thermoset state. Such a material would permit the coating of insulated wire during manufacture and after prolonged periods of time, the fabrication of the wire by the user into any desired configuration such as that of a coil, the turn coatings of which could then be fused at a suitable temperature to provide a unitary, self-supporting structure.

An object then of this invention is to provide polyurethane type bonding compositions which are thermoplastic for extended periods until heated to relatively high temperatures whereupon they fuse to a thermoset stage.

Briefly stated, my invention comprises the process and the product which results from reacting (1) a compound containing three or more isocyanate groups per molecule in which all but two of the isocyanate groups are blocked or masked with an isocyanate splitter type material and (2) a polyester containing three or four hydroxyl groups. The materials can be used in amounts by weight of from about 60 to 75 parts of masked polyisocyanate and about 70 to 90 parts of polyester. Preferably I use about 60 parts of masked polyisocyanate and about 80 parts of polyester. The material produced can be applied to a surface as a tough, flexible, non-tacky film or coating which is thermoplastic at room temperature or at reasonably elevated temperatures over prolonged periods of time. When desired the material can be heated to a higher temperature, for example from about 125° C. or higher for a short period of time to free the isocyanate groups from the masking or blocking material and permit their reaction with the hydroxyl groups of the polyester to form a thermoset material.

Those features of my invention which I believe to be novel are set forth with particularity in the claims appended hereto. My invention, however, both as to its organization and mode of operation will be better understood from a consideration of the following description and the drawing in which the single figure illustrates the application of my adhesive compositions as a wire overcoating.

Typical isocyanates which can be used in the practice of the invention are triphenylmethane triisocyanate, benzene triisocyanate, tolylene triisocyanate, silicon triisocyanate, ethylene tetraisocyanate, and diphenyl triisocyanate. As pointed out above, any isocyanate containing three or more isocyanate groups per molecule may be used and others of such compounds in addition to those above will occur to those skilled in the art. In lieu of starting with a material containing three or more isocyanate groups per molecule, such materials may conveniently be made by reacting diisocyanates with polyhydric compounds containing three or more hydroxyl groups per molecule in the ratio of one diisocyanate molecule per hydroxyl group in the hydroxy compound. Typical diisocyanates which may be so reacted are alkylene diisocyanates such as ethylene diisocyanate, trimethylene diisocyanate, hexamethylene diisocyanate, propylene-1,2 diisocyanate, and ethylidene diisocyanate; cycloalkylene diisocyanates such as cyclopentalene diisocyanate, aromatic diisocyanates such as tolylene diisocyanate, naphthalene diisocyanate, 1,4-phenylene diisocyanate, aliphatic aromatic diisocyanate such as ethylene-1,4 diisocyanate, aromatic aliphatic diisocyanates such as 1-phenyl-1,3-diisocyanate, etc. Numerous polyhydric compounds may be used containing three or four hydroxyl groups such as glycerin, trimethylol propane, pentaerythritol, various polyesters with excess hydroxyl groups, phenol formaldehyde resins made with excess formaldehyde and various epoxy resins. The polyurethane material containing three or more isocyanate groups is reacted with an isocyanate splitter type material containing one active hydrogen per molecule preferably of the phenol type or a phenol derivative such as phenol, chlorophenol or cresol which will split off from the polyurethane molecule at temperatures from about 125° C. to 200° C. or higher and in such amount that two free isocyanate groups are present per isocyanate molecule. An excess of masking material up to 20 percent can be employed without detracting from the finished product. The partially blocked isocyanate material is then mixed as with a polyester having a functionality of three or four to produce a predominantly linear thermoplastic material. It has been found that polyester compounds with a functionality of two or less will not produce a thermoset coating in the subsequent heating stage, while such materials having a functionality of greater than four will not produce a suitable thermoplastic polymer composition. Preferably also, the tetrafunctional polyester has an acid number of from about 16 to 25. With an acid number of under 15 the isocyanate-polyester mixtures of this type tend to have an undesirable gelling characteristic, while acid numbers of over 25 result in carbon dioxide formation which is also undesirable. In trifunctional polyesters an acid number of 10 to 25 is preferred.

In order to accelerate the decomposition reaction or the splitting off of the splitter type material, I add a small amount of an accelerator such as a tertiary amine compound, for example, tributyl amine, tris-(dimethyl aminomethyl) phenol, etc.

The following examples will illustrate typical materials having three or four hydroxyl groups per molecule which may be used in the practice of my invention.

*Example I*

A polyester was prepared by reacting together 58.4 grams adipic acid, 59.2 grams phthalic anhydride, 80.4 grams propylene glycol and 53.6 grams trimethylol propane. The reaction started after heating to about 150° C. and the temperature rose to 200° C. in about one hour. After three hours a polyester having an acid number of 22.2 was obtained.

*Example II*

A polyester was prepared using 175 grams adipic acid, 199 grams isophthalic acid, 254 grams diethylene glycol and 80 grams trimethylol propane to give an acid number of 10.

*Example III*

A polyester was prepared by reacting 175 grams adipic acid, 177 grams phthalic anhydride, 161 grams trimethylol propane and 191 grams diethylene glycol to an acid number of 22.8.

The following example will illustrate a typical preparation of isocyanate material, it being realized that those skilled in the art may vary the materials and procedure in many ways so long as a suitable isocyanate end product is obtained having three or more isocyanate groups per molecule.

*Example IV*

A 50% by weight solution of a triisocyanate was prepared by reacting 522 grams of tolylene diisocyanate in 150 cc. of ethyl acetate with a solution of 134 grams of trimethylol propane in 563 cc. of ethyl acetate, the trimethylol propane solution being added dropwise to the diisocyanate and with the temperature kept below 35° C. About three hours was required for the completion of the reaction.

The following examples are typical of the many wire coatings which can be made using the teaching of the invention.

*Example V*

To 440 grams of a fifty percent by weight solution of the triisocyanate of Example IV in ethyl acetate was added 32 grams of phenol as a blocking agent and influxed at about 40° C. To this reacted mixture was added 290 grams of the polyester of Example I along with 600 cc. of ethyl acetate. After thorough mixing a non-tacky, flexible, tough material resulted having good adherent properties to metals, resins and other surfaces in general. The material had a prolonged shelf life and when heated to temperatures of 125° C.–200° C. for a short period of time fused to a thermoset material. As applied to insulated wire in a one mil film it can be cured to a good bonding strength by heating at 150° C. for about fifteen minutes. It will be appreciated of course that the curing cycle is of a time-temperature nature, the lower temperatures requiring a longer time and the higher temperatures a shorter time. The resin is applied to the already insulated wire as an adhesive overcoat in any desired concentration depending upon the thickness of coating desired, etc. For general purposes a fifty percent by weight concentration of resin is suitable. A typical application of the materials of this invention is shown in the drawing wherein conductor 1 is coated with an insulating resin 2 of the usual type and overcoated with the present bonding material 3.

*Example VI*

To 137.5 grams of the triisocyanate of Example IV as a fifty percent by volume solution in ethyl acetate there was added 9.4 grams of phenol, the mixture being influxed at 40° C.–50° C. until reaction had taken place. To this there was added 87.0 grams of the polyester of Example I and 8.7 grams of epoxy resin Epon 1004 in 41.3 grams of dichlorobenzene along with 7.5 grams of tris (dimethyl amino-methyl) phenol. Epon 1004 is a reaction product of bis-(4-hydroxy phenyl-2,2-propane and epichlorohydrin having a melting point of from 97° C.–103° C., an epoxide equivalent of 905–985 and an esterification equivalent of about 175. Such resinous materials are described in U.S. Patents 2,324,483, 2,444,333, 2,494,295, 2,500,600 and 2,511,913 among others which are included herein by reference. When coated on an insulated wire by the well known dip and die or wipe method the above formulation provided a non-tacky thermoplastic surface which when heated to a temperature of 125° C. or higher fused to a thermoset state.

*Example VII*

To a reacted mixture of 132 grams of the triisocyanate of Example IV with 13.9 grams of nitrophenol there were added 100.5 grams of the polyester of Example II along with 0.7 gram tris (dimethylamino-methyl) phenol. To 64 grams of the above composition was added 8.0 grams of finely divided silica. When a steel panel was dipped in the resultant mixture, a thermoplastic coating which fused to a thermoset bonding condition at 125° C. was obtained.

*Example VIII*

To 132.0 grams of the triisocyanate of Example IV reacted with 13.9 grams of p-nitrophenol there was added 87.0 grams of the polyester of Example I along with .7 gram of tris (dimethylamino-methyl) phenol and 45.0 grams of ethyl acetate. The resultant mixture again provided a thermoplastic coating for an insulated wire or other material which fused to the thermoset state when heated as above.

*Example IX*

To 132 grams of the polyisocyanate of Example IV reacted with 14.1 grams p-chlorophenol was added 80.1 grams of the polyester of Example IV along with 42. grams of ethyl acetate and 1.5 grams tris (dimethylaminomethyl) phenol. This material again provided a coating which remained thermoplastic at ordinary temperatures and became thermoset when heated to 125° C. to 200° C. or higher.

There are provided by this invention bonding materials which may be applied to a base material as a thermoplastic film which will remain thermoplastic at reasonably elevated temperatures for extended periods of time and, which when heated to temperatures of 125° C. to 200°

C. or higher, will fuse to a thermoset state, bonding and fusing to any adjacent structure. As overcoatings for insulated electrical conductors they are applied over the usual resinous or other conductor insulation to which they adhere firmly. When used to bond articles together, they are applied directly to one or both of the objects to be joined.

What I claim as new and desire to secure by Letters Patent of the United States is:

1. A composition of matter comprising (1) an organic polyisocyanate material containing at least three isocyanate groups per molecule of which all but two are masked by a masking material selected from the group consisting of phenols, phenol derivatives and malonic esters and containing active hydrogen in such amount that the product of reaction contains two free isocyanate groups per molecule and (2) an organic polyester prepared from a carboxylic acid and a polyhydric alcohol, said organic polyester being selected from the group consisting of polyesters having 3 hydroxyl groups per molecule and an acid number of 10 to 25 and polyesters having 4 hydroxyl groups per molecule and an acid number of 16 to 25.

2. A process of coating a wire conductor which comprises the steps of (1) applying the composition of claim 1 to a wire conductor (2) heating said coated conductor to a temperature between 125° F. and 200° F. to form a thermoset product on said conductor.

3. An insulated conductor comprising an electrical conductor with insulation thereon comprising (1) an organic polyisocyanate material containing at least three isocyanate groups per molecule of which all but two are masked by a masking material selected from the group consisting of phenols, phenol derivatives and malonic esters and containing active hydrogen in such amount that the product of reaction contains two free isocyanate groups per molecule and (2) an organic polyester prepared from a carboxylic acid and a polyhydric alcohol, said organic polyester being selected from the group consisting of polyesters having 3 hydroxyl groups per molecule and an acid number of 10 to 25 and polyesters having 4 hydroxyl groups per molecule and an acid number of 16 to 25.

4. The process of preparing a heat hardenable coating composition which comprises (1) reacting an organic polyisocyanate material containing at least three isocyanate groups per molecule with a masking material selected from the group consisting of phenols, phenol derivatives and malonic esters and containing reactive hydrogen in such amount that the product of reaction contains two free isocyanate groups per molecule and (2) reacting the product thus formed with an organic polyester prepared from a carboxylic acid and a polyhydric alcohol, said organic polyester being selected from the group consisting of polyesters having 3 hydroxyl groups per molecule and an acid number of 10 to 25 and polyesters having 4 hydroxyl groups per molecule and an acid number of 16 to 25.

References Cited in the file of this patent

UNITED STATES PATENTS

| | | |
|---|---|---|
| 2,333,922 | Foster | Nov. 9, 1943 |
| 2,531,392 | Breslow | Nov. 28, 1950 |

FOREIGN PATENTS

| | | |
|---|---|---|
| 150,416 | Australia | May 3, 1951 |

OTHER REFERENCES

Bayer: Modern Plastics, pp. 152, 153 and 250, June 1947.